United States Patent
Mehmedagic

(10) Patent No.: US 11,936,740 B2
(45) Date of Patent: Mar. 19, 2024

(54) MODELING AND MANAGEMENT OF INDUSTRIAL NETWORK USING OPCUA

(71) Applicant: Schneider Electric USA, Inc., Andover, MA (US)

(72) Inventor: Alen Mehmedagic, Wilmington, MA (US)

(73) Assignee: Schneider Electric USA, Inc., Boston, MA (US)

(*) Notice: Subject to any disclaimer, the term of this patent is extended or adjusted under 35 U.S.C. 154(b) by 0 days.

(21) Appl. No.: 17/745,663

(22) Filed: May 16, 2022

(65) Prior Publication Data
US 2022/0377144 A1    Nov. 24, 2022

Related U.S. Application Data

(60) Provisional application No. 63/190,776, filed on May 19, 2021, provisional application No. 63/190,221, filed on May 18, 2021.

(51) Int. Cl.
*H04L 67/10* (2022.01)
*H04L 41/0806* (2022.01)
(Continued)

(52) U.S. Cl.
CPC ........ *H04L 67/141* (2013.01); *H04L 41/0806* (2013.01); *H04L 67/10* (2013.01); *H04L 67/12* (2013.01)

(58) Field of Classification Search
CPC ... H04L 67/141; H04L 41/0806; H04L 67/10; H04L 41/0213; H04L 67/12; H04L 41/04; H04L 41/0226
See application file for complete search history.

(56) References Cited

U.S. PATENT DOCUMENTS

2020/0259896 A1*  8/2020  Sachs .................. H04L 63/0823

FOREIGN PATENT DOCUMENTS

EP    3654123 A1    5/2020
EP    3716531 A1    9/2020

OTHER PUBLICATIONS

Tian, Shuo, and Yihong Hu. "The role of opc ua tsn in it and ot convergence." 2019 chinese automation congress (cac). IEEE, 2019.
(Continued)

*Primary Examiner* — Cheikh T Ndiaye
(74) *Attorney, Agent, or Firm* — Locke Lord LLP

(57) ABSTRACT

Methods/systems are provided for extending the capabilities of OPCUA to network devices that are otherwise configured and managed using NETCONF-YANG and SNMP-MIB protocols. The extension of OPCUA allows these devices to be described in network communications in the same manner as MIB or YANG. The systems/methods provide a CUC configured to request a TSN connection on the industrial network, the CUC including an OPCUA model therein. The CUC interacts with and configures an OPCUA based industrial controller connected to the industrial network, and an OPCUA based industrial device connected to the industrial network, to determine TSN parameters required for the TSN connection. The systems/methods further provide a CNC configured to provision the TSN connection on the industrial network upon request by the CUC. In some embodiments, the CNC includes an OPCUA model therein. Alternatively, the CUC may translate the TSN parameters from OPCUA parameters to YANG-MIB parameters for the CNC.

20 Claims, 9 Drawing Sheets

(51) Int. Cl.
*H04L 67/12* (2022.01)
*H04L 67/141* (2022.01)

(56) References Cited

OTHER PUBLICATIONS

European Search Report for EP Application No. 22173696 dated Sep. 21, 2022.

\* cited by examiner

MODELING AND MANAGEMENT OF INDUSTRIAL NETWORK USING OPCUA

CROSS-REFERENCE TO RELATED APPLICATIONS

This application for patent claims the benefit of priority to and incorporates herein by reference U.S. Provisional Application No. 63/190,221, entitled "Modeling and Management of Industrial Network Using OPCUA," filed May 18, 2021, and U.S. Provisional Application No. 63/190,776, entitled "Modeling and Management of Industrial Network Using OPCUA," filed May 19, 2021.

BACKGROUND

Communication networks (or simply networks) enable data communication, for example, between computers, computers and peripherals and other devices. Different domains have different requirements for data communication. For example, in the industrial domain, physical processes have strict timing requirements that need to be controlled and monitored for safety and other reasons. Take an example of a high-speed cheese slicing system where an automated knife blade slices through a block of cheese that is pushed forward by a cheese block feeder driven by motors. By how much the cheese block feeder needs to advance is determined by a scanning system that analyzes the holes in the cheese block. In order for the cheese slicing system to produce cheese slices of approximately the same weight, the motion of the knife blade must be synchronized with the movement of the cheese block. Even a small delay in this system (either in processing or network delay) can mean cheese slices of non-uniform weights, resulting in wastage and loss of productivity. Similarly, in the automotive domain, safety critical applications which enable safety features (e.g., auto braking) and autonomous driving also have strict timing requirements for communication. Any unaccounted-for delay in the system can have serious safety implications.

In industrial, automotive, and many other domains, there is an increasing desire to use Ethernet technology for the network backbone and throughout the entire network to support Internet of Things (IoT)/Industrial Internet of Things (IIoT) connectivity in order to benefit from remote monitoring and management, centralized analytics, and the like. The Ethernet network would preferably span from industrial sensors all the way to on-premise cloud, where present, to provide a uniform and standardized approach that eliminates the need for proprietary solutions, increases interoperability, and reduces the cost of network installation and operation. The Ethernet standard, however, cannot guarantee that critical data will be delivered across a network from device A to device B in time, which is a key requirement for both industrial and automotive applications. Time-sensitive networking (TSN), which offers a fully deterministic real-time delivery of Ethernet traffic, is a solution that can meet the requirements of industrial, automotive, and other time-critical applications.

The introduction of TSN, however, can cause network managing and monitoring to become even more complex. This is because today's industrial networks are managed and monitored using IT tools and protocols that employ SNMP-MIB and NETCONF-YANG. SNMP (Simple Network Management Protocol) uses a data modeling language called SMI (Structured Management Information) and stores data in an MIB (Management Information Base), while NETCONF uses the YANG data modeling language. On the other hand, many if not most of the industrial systems, equipment, and devices that communicate over those networks employ OPCUA (Open Platform Communications Unified Architecture). OPCUA is a data exchange standard commonly used for industrial (e.g., machine-to-machine, PC-to-machine, etc.) communication. Therefore, it would be beneficial to extend OPCUA to the current SNMP-MIB and NETCONF-YANG network management domain. Transforming the data of already existing network management protocols and the data models of SNMP-MIB and NETCONF-YANG into OPCUA models while extending them with industrial ontology would lead to reduced system complexity and ease of system design and operations.

SUMMARY

Embodiments of the present disclosure relate to systems and methods for extending the capabilities of OPCUA to network devices that are otherwise configured and managed using NETCONF-YANG and SNMP-MIB protocols. The extension of OPCUA would allow these networking devices to be described in network communications in the same manner as MIB or YANG. In some embodiments, the systems and methods provide a Centralized User Configuration (CUC) configured to request a TSN connection on the industrial network, the CUC including an OPCUA model therein. The CUC interacts with and configures an OPCUA based industrial controller connected to the industrial network, and an OPCUA based industrial device connected to the industrial network, to determine TSN parameters required for the TSN connection. The systems and methods further provide a Centralized Network Controller (CNC) configured to provision the TSN connection on the industrial network upon request by the CUC. In some embodiments, the CNC includes an OPCUA model therein. Alternatively, CUC may translate the TSN parameters from OPCUA parameters to YANG-MIB parameters for the CNC.

In general, in one aspect, embodiments of the present disclosure relate to a TSN capable industrial network implementing OPCUA thereon. The industrial network comprises, among other things, an OPCUA based industrial controller connected to the industrial network via a controller switch in the industrial controller, and an OPCUA based industrial device connected to the industrial network via a device switch in the industrial device. The industrial network further comprises a CUC connected to the industrial network, the CUC having an OPCUA model therein, the CUC operable to interact with the OPCUA based industrial controller and the OPCUA based industrial device to determine one or more TSN parameters required for provisioning a TSN connection therebetween. The CUC is further operable to transmit the one or more TSN parameters from the CUC to a Centralized Network Controller (CNC) on the industrial network to request provisioning of the TSN connection.

In general, in another aspect, embodiments of the present disclosure relate to a method of implementing OPCUA on a TSN capable industrial network. The method comprises, among other things, connecting an OPCUA based industrial controller to the industrial network via a controller switch in the industrial controller, and connecting an OPCUA based industrial device to the industrial network via a device switch in the industrial device. The method also comprises connecting a CUC to the industrial network, the CUC having an OPCUA model therein, and operating the CUC to interact with the OPCUA based industrial controller and the OPCUA based industrial device to determine one or more TSN parameters required for provisioning a TSN connection therebetween. The method further comprises transmitting the one or more TSN parameters from the CUC to a Centralized Network Controller (CNC) on the industrial network to request provisioning of the TSN connection.

In general, in still another aspect, embodiments of the present disclosure relate to a non-transitory computer-readable medium storing computer-readable instructions thereon for implementing OPCUA on a TSN capable industrial network. The computer-readable instructions, when executed by one or more processors, cause a computer to perform a process that connects an OPCUA based industrial controller to the industrial network via a controller switch in the industrial controller, and connects an OPCUA based industrial device to the industrial network via a device switch in the industrial device. The computer-readable instructions, when executed by one or more processors, also cause the one or more processors to perform a process that connects a CUC to the industrial network, the CUC having an OPCUA model therein, operates the CUC to interact with the OPCUA based industrial controller and the OPCUA based industrial device to determine one or more TSN parameters required for provisioning a TSN connection therebetween. The computer-readable instructions, when executed by one or more processors, further cause the one or more processors to perform a process that operates the CUC to transmit the one or more TSN parameters to a CNC on the industrial network to request provisioning of the TSN connection.

In accordance with any one or more of the foregoing embodiments, the CNC is a NETCONF/SNMP based CNC and the TSN parameters are translated by the CUC from OPCUA parameters to YANG/MIB parameters.

In accordance with any one or more of the foregoing embodiments, the CNC is a NETCONF/SNMP based CNC that has an OPCUA model therein, and the TSN parameters are translated by the CNC from OPCUA parameters to YANG/MIB parameters.

In accordance with any one or more of the foregoing embodiments, the TSN parameters are translated by the OPCUA based industrial controller and/or the OPCUA based industrial device from OPCUA parameters to YANG/MIB parameters.

In accordance with any one or more of the foregoing embodiments, a network switch is connected to the industrial network, wherein the network switch has an OPCUA model therein.

In accordance with any one or more of the foregoing embodiments, the CUC is configured using one or more engineering tools, the one or more engineering tools having an OPCUA model therein.

In accordance with any one or more of the foregoing embodiments, the CUC and the CNC are implemented on the industrial network as: a distributed system in which the CNC and CUC are distributed across multiple components and devices on the industrial network; a cloud-based system in which the CNC and CUC reside in a cloud-computing environment; an integrated system in which the CNC and CUC are integrated into the OPCUA based industrial controller and/or the OPCUA based industrial device, and the CUC and CNC directly control the industrial controller and/or the industrial device; a fused system in which the CNC and CUC are combined into a single device; or one or more engineering tools used to configure the industrial network.

DETAILED DESCRIPTION

Figure 1:
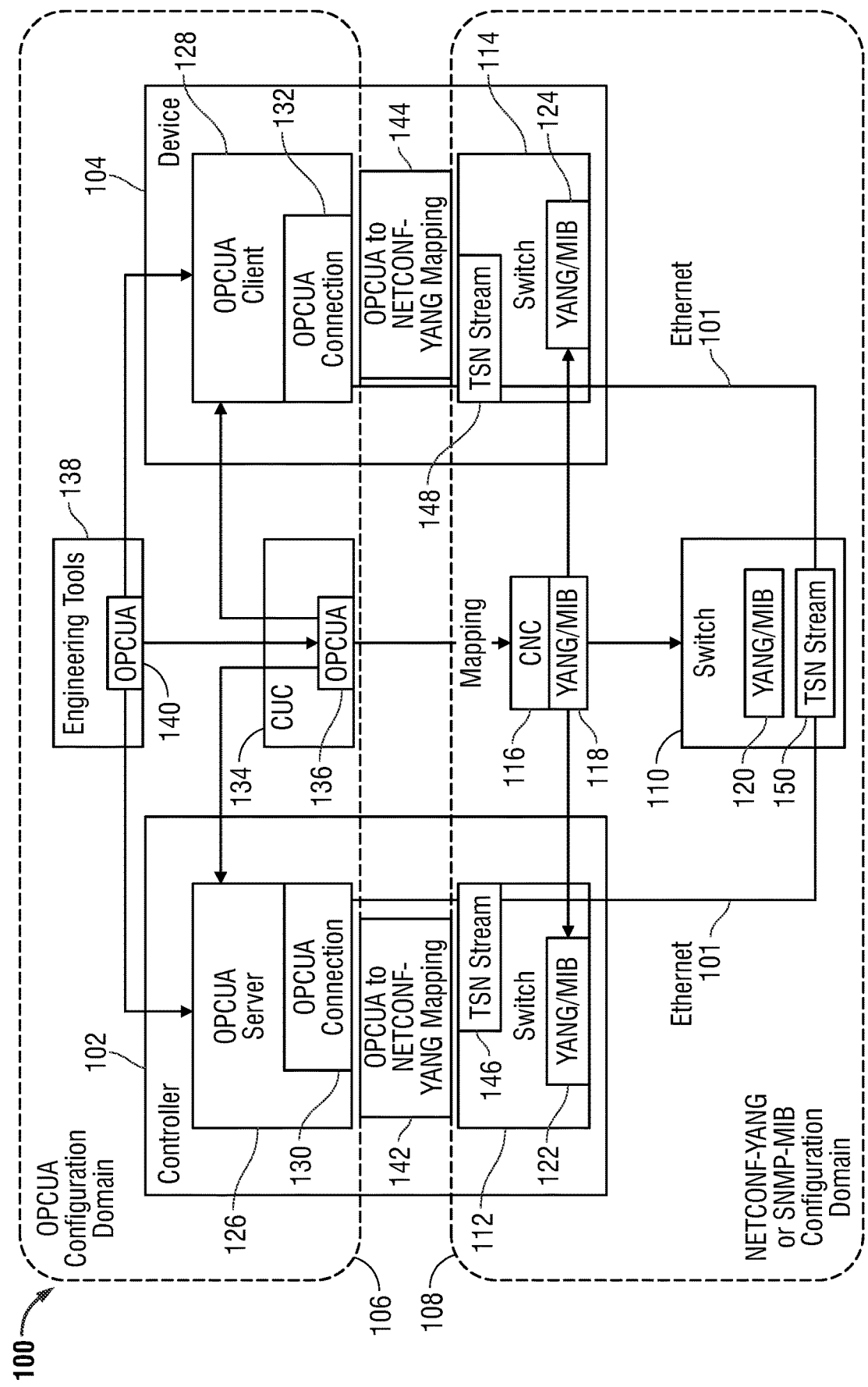
FIG. 1 is a functional block diagram illustrating an exemplary TSN capable OPCUA industrial system in accordance with some embodiments of this disclosure.

This description and the accompanying drawings illustrate exemplary embodiments of the present disclosure and should not be taken as limiting, with the claims defining the scope of the present disclosure, including equivalents. Various mechanical, compositional, structural, electrical, and operational changes may be made without departing from the scope of this description and the claims, including equivalents. In some instances, well-known structures and techniques have not been shown or described in detail so as not to obscure the disclosure. Further, elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

As alluded to above, the NETCONF-YANG and SNMP-MIB protocols provide IEEE standardized means of managing an industrial network. As such, they impose implementation of these protocols into the industrial devices that use these protocols. TSN brings further development with the introduction of CNC (Centralized Network Controller) network controllers, which also use NETCONF-YANG. These concepts in turn have to be implemented in an OPCUA/TSN publish-subscribe (pub-sub) industrial solution, which can be costly, complicated, and time-consuming. But OPCUA is already capable of modeling any industrial devices and already has all necessary features for successful operation. It would thus be beneficial to extend the capabilities of OPCUA to describe networking devices in the same manner that MIB or YANG do using the features, compatibility, and security of OPCUA. This would result in a simpler industrial system.

In addition, OPCUA provides devices/entities with the ability to reference other OPCUA information model entities, i.e., create links to the other entities. This ability, when OPCUA is deployed to a CNC, can serve as an additional feature for browsing the network. For example, when the communication ports of two switches are connected, a link can be formed using an OPCUA object to connect the port models from both switches, and the object can also be linked with connection information describing connection characteristics, for example, cable lengths, if such feature is available, or the TAS tables of each port. Thus, when mapping YANG/MIB to OPCUA, the mapping can be extended to make browsing information easier. And naturally, with ease of browsing comes ease of computation and diagnostics. In a fully OPCUA domain, this browsing comes natively, as engineering tools would be able to use OPCUA network information to describe the intended networks and the CNC's OPCUA information model can be compared to verify the networks.

Accordingly, embodiments of the present disclosure provide systems and methods for extending OPCUA to network devices that are otherwise configured and managed using NETCONF-YANG and SNMP-MIB protocols. The extension of OPCUA would allow these networking devices to be described in the same manner as MIB or YANG. In some embodiments, the disclosed systems and methods for extending OPCUA provide, among other things, one or more, or all, of the following:
  (a) YANG/MIB-to-OPCUA network information model translator that generates OPCUA address space from existing MIB and YANG models and makes it manageable using OPCUA features.
  (b) Bridges and bridged end stations that implement the address space in (a) and eliminate an explicit need for implementation of YANG and MIB while leaving the option for data exchange using NETCONF or SNMP. This would reduce the address space consumed by devices and the number of technological features that need to be maintained.
  (c) Engineering tools (local or cloud based) implementing (a) that would be able to discover entire networking infrastructure using the OPCUA unified protocol without explicit need to implement network specific protocols.
  (d) CUC (Centralized User Configuration) and CNC entities of TSN implementing (a) that enable easier implementation and distribution of responsibilities.
  (e) Industrial application designers who use OPCUA will have direct influence and decision on how to manage and control networking infrastructure during run time.
  (f) Distributed industrial applications (IEC61499) that have runtime access to networking infrastructure and hence decision-making ability regarding workload deployment (the IEC61499 model has its own OPCUA model and address space).
  (g) Aggregate networking devices that are created using OPCUA features and therefore network segmentation can be described with ease of use.
  (h) Diagnostics tools that use the same information and OPCUA protocol to maintain and diagnose network problems.

Referring now to FIG. 1, a functional block diagram is shown for an example of a TSN capable industrial system 100 of the type used in factories, plants, assembly lines, and other facilities that require time-critical deterministic communications and functions. The industrial system 100 is a system in which an industrial controller 102 is used to automatically control operation of at least one industrial device 104 to perform an industrial function at the facility. For example, the industrial controller 102 may be a motor controller that can control multiple devices at a time, and the at least one industrial device 104 may be a motor that can be controlled by the industrial controller 102 to operate, for example, a cheese blade for automatically slicing cheese, as discussed above. A network 101, such as an Ethernet network, provides the signal pathway for messages to travel between the industrial controller 102 and the industrial device 104, as well as other devices in industrial system 100.

In the example of FIG. 1, the exemplary TSN capable industrial system 100 implicates two distinct configuration domains, namely, a device configuration domain 106 and a network configuration domain 108. The device configuration domain 106 provides the ability to configure the way the industrial controller 102 communicates with the at least one industrial device 104, and vice versa. The network configuration domain 108 provides the ability to configure the way the industrial controller 102 and the industrial device 104 send and receive messages from one another in real time or near real time over the network 101.

The particular device configuration domain 106 implemented in the industrial system 100 is an OPCUA based device configuration domain 106 in which OPCUA is used as the protocol for exchanging data between the industrial controller 102 and the at least one industrial device 104. The particular network configuration domain 108 implemented in the industrial system 100 can be either a NETCONF-YANG or a SNMP-MIB based network configuration domain 108. Either of these network control protocols is capable of managing a TSN capable network, which is needed for the real-time or near real-time delivery of messages required by the industrial system 100.

In the example, the network 101 includes one or more network switches 110 between the industrial controller 102 and the industrial device 104, with only one switch 110 shown here for simplicity. The network switches 110, which may also include bridges and relays, provide a bridge between the industrial controller 102 and the industrial device 104. The industrial controller 102 and the industrial device 104 are examples of TSN end stations or end devices. Bridged end stations are end devices that communicate over the network 101 using one or more intervening switches, bridges, or relays. The bridged end devices themselves usually contain integrated switches/bridges. The integrated switches/bridges can be implemented as a single SOC (system-on-chip) or as separate ASICs (application-specific integrated circuits) connected over an internal Ethernet interface, such as a MII (media-independent interface), GMII (gigabit media-independent interface), RGMII (reduced-gigabit media-independent interface), and other types of MII. To facilitate the communication, the industrial controller 102 includes a controller switch 112 and the industrial device 104 includes a device switch 114, as shown. The network switches 110, the controller switch 112, and the industrial device switch 114 allow the industrial controller 102 to be connected to the industrial device 104 over the network 101.

To implement the network configuration domain 108 as a NETCONF-YANG or a SNMP-MIB based network configuration domain 108, several NETCONF-YANG or SNMP-MIB modules or components are used. In particular, a CNC 116 is used to configure the network switches 110, as represented by the arrow therebetween, to provide a way for messages to be routed through the network switches 110 based on the type of devices that send and receive the messages. The CNC 116 is basically an application that acts as a proxy for the network (i.e., the network switches, bridges, relays, etc.) to define the schedule for transmission of TSN frames on the network 101. The CNC 116 is configured to calculate specific paths through the network switches 110 and the timing therefor for the messages being routed through the network switches 110 between the industrial controller 102 and industrial device 104. This CNC 116, the network switches 110, controller switch 112, and device switch 114 constitute the equipment portion of the network configuration domain 108.

The network 101 itself (e.g., the Ethernet network) can be managed and monitored using the NETCONF standard or the SNMP standard. The monitoring monitors not only TSN streams, but also the entire network, with all its available features (e.g., port states, port statistics, forwarding table entries, PTP (Precision Timing Protocol) timing statistics, policing and shaping features, etc.). The network configuration domain 108 further includes either a YANG model or an MIB model within each of the switches. Thus, the CNC 116 includes a YANG or MIB model 118, the network switch 110 includes a YANG or MIB model 120, the controller switch 112 includes either a YANG or MIB model 122, and the device switch 114 includes either a YANG or MIB model 124. The YANG or MIB model 118, 120, 122, 124 generally describes what the network looks like for each of these devices.

Similarly, to implement the device configuration domain 106 as an OPCUA based device configuration domain 106, several OPCUA modules or components are used. In particular, the industrial controller 102 includes an OPCUA server 126 that is configured to publish/send or subscribe/receive OPCUA messages to the at least one industrial device 104, and each industrial device 104 includes an OPCUA client 128 that can subscribe/receive or publish/send OPCUA messages from the industrial controller 102. A controller OPCUA connection 130 within the OPCUA server 126 and a device OPCUA connection 132 within the OPCUA client 128 allows the OPCUA server 126 and the OPCUA client 128 to communicate with each other and with other devices on the network.

A CUC 134 is present to provide OPCUA connection configuration that carries the parameters required to provision a TSN stream within the network switches 110, the controller switch 112, and the device switch 114. The CUC 134 is basically an application that communicates with the CNC 116 and the end devices to request provision of the TSN stream. Based on the OPCUA connectivity requested by the industrial controller 102 and the industrial device 104, the CUC 134 deduces the TSN stream requirements and passes them to the CNC 116, as represented by the arrow therebetween. The CNC 116 receives the TSN stream requirements and accordingly configures the network switches 110, controller switch 112, and device switch 114, as represented by the arrows therebetween, to provision the requested connectivity between the industrial controller 102 and the industrial device 104. To this end, the CUC 134 includes a CUC OPCUA model 136 that performs translation or mapping of the requested OPCUA connections received from the CUC 134 to the CNC 116.

Any network tool within a set of engineering tools 138 that may be needed to configure and set up the industrial controller 102, the industrial device 104, and/or the CUC 134, as represented by the arrows therebetween, are also equipped with an engineering tool OPCUA model 140. The engineering tool OPCUA model 140 facilitates mapping the connection requirements of the engineering tools 138 to the OPCUA server 126 and the OPCUA client 128 of the industrial controller 102 and the industrial device 10, respectively. Implementation of the OPCUA model 140 in the engineering tools 138 (which may be local or cloud based) makes it possible to discover entire networking infrastructure using the OPCUA unified protocol without explicit need to implement network specific protocols. The use of such engineering tools 138 provides industrial application designers with direct influence and decision-making ability on how to manage and control networking infrastructure during run time. Likewise, network diagnostics tools would be able to use the same information and OPCUA protocol to maintain and diagnose network problems.

As can be seen from the above industrial system 100, the device configuration domain 106 and the network configuration domain 108 are separate and distinct from one another. Therefore, in some embodiments, an OPCUA-to-NETCONF-YANG mapping component is provided to perform the mapping or translation between OPCUA and NETCONF-YANG. Thus, a controller OPCUA-to-NETCONF-YANG mapping component 142 is provided in the industrial controller 102 to perform mapping between the OPCUA server 126 and the controller switch 112. Similarly, a device OPCUA-to-NETCONF-YANG mapping component 144 is provided in the industrial device 104 to perform mapping between the OPCUA client 128 and the device switch 114. Each of these OPCUA-to-NETCONF-YANG mapping components 142, 144 provides mapping between their respective OPCUA connection 130, 132 and a TSN stream 144 provisioned by the controller switch 112, and a similar TSN stream 146 provisioned by the device which 114. The network switch 110 provisions a similar TSN stream 150 therein.

The OPCUA-to-NETCONF-YANG mapping components 142, 144 can be tedious and time-consuming to implement, however. Therefore, in some embodiments, rather than provide the OPCUA-to-NETCONF-YANG mapping components 142, 144 in the industrial controller 102 and the industrial device 104, respectively, an improved type of CNC may be provided that includes a CNC OPCUA model directly within the CNC itself. Such an arrangement obviates the need to provide the NETCONF-YANG or the SNMP-MIB modules or components within the various switches 110, 112, 114 discussed above. It should be noted that the same OPCUA model is required in switches as well only when network management protocols are not required.

Figure 2:
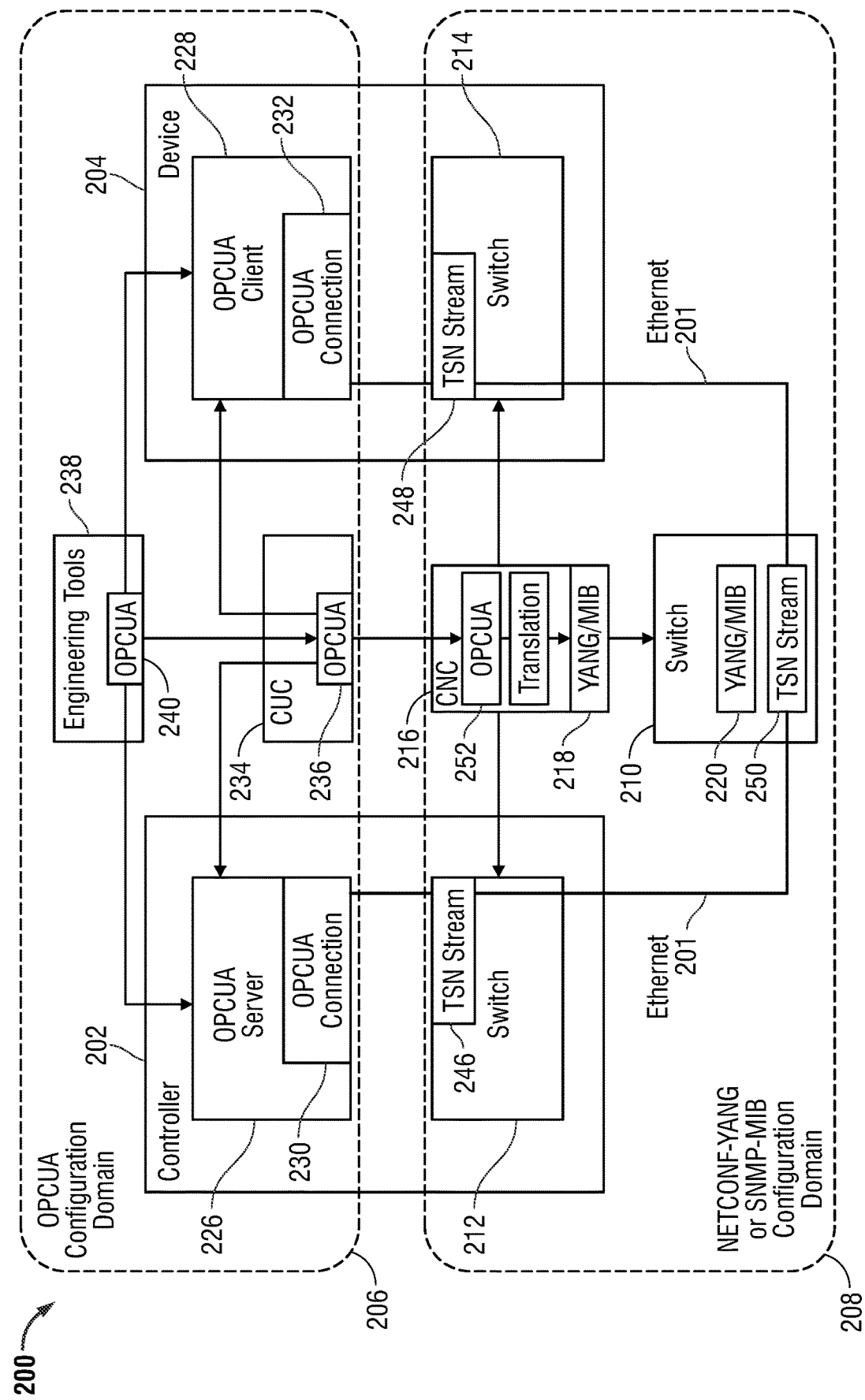
FIG. 2 is a functional block diagram illustrating an alternative TSN capable OPCUA industrial system in accordance with some embodiments of this disclosure.

FIG. 2 is a functional block diagram showing an exemplary TSN capable industrial system 200 implementing the improved CNC mentioned above. As can be seen, the industrial system 200 is similar to the TSN capable industrial system 100 from FIG. 1 insofar as elements that are labeled with 200 series numbering are similar to their counterparts from FIG. 1 that are labeled with 100 series numbering. Thus, there is an industrial controller 202 that is used to automatically control operation of at least one industrial device 204 to perform an industrial function at the facility. A network 201, such as an Ethernet network, provides the signal pathway for messages to travel between the industrial controller 202 and the industrial device 204, as well as other devices on the network 201. The network 201 includes one or more network switches 210 for provisioning a TSN stream 250 between the industrial controller 202 and industrial device 204. The industrial controller 202 similarly includes a controller switch 212 for provisioning its respective TSN stream 246 and the industrial device 204 similarly includes a device switch 214 for provisioning its respective TSN stream 248, as shown.

There are also two distinct configuration domains, namely, an OPCUA based device configuration domain 206 in which OPCUA is used as the protocol for exchanging data between the industrial controller 202 and the at least one industrial device 204, and a configuration domain 208 that can be either a NETCONF-YANG or a SNMP-MIB based network configuration domain 208. Either of these network control protocols is capable managing a TSN capable network, which is needed for the real-time or near real-time delivery of messages required by the industrial system 200.

A CNC 216 is again used to configure the network switches 210, as represented by the arrow therebetween, to provide a way for messages to be routed through the network switches 210 based on the type of devices that send and receive the messages. The CNC 216 includes a YANG or MIB model 218, and the network switch 210 includes a YANG or MIB model 220. The industrial controller 202 includes an OPCUA server 226 that is configured to publish/send or subscribe/receive OPCUA messages to the at least one industrial device 204, and each industrial device 204 includes an OPCUA client 228 that can subscribe/receive or publish/send OPCUA messages from the industrial controller 202. A controller OPCUA connection 230 within the OPCUA server 226 and a device OPCUA connection 232 within the OPCUA client 228 allows the OPCUA server 226 and the OPCUA client 228 to communicate with each other and with other devices on the network.

A CUC 234 is again present to provide OPCUA connection configuration that carries the parameters required to provision a TSN stream within the network switches 210, the controller switch 212, and the device switch 214. The CUC 234 includes a CUC OPCUA model 236 that performs translation or mapping of requested OPCUA connections received from the CUC 234 to the CNC 216. Any network tools within a set of engineering tools 238 that may be needed to configure and set up the industrial controller 202, the industrial device 204, and/or the CUC 234, as represented by the arrows therebetween, are also equipped with an engineering tool OPCUA model 240.

However, the CNC 216 in FIG. 2 is an improved CNC that includes a CNC OPCUA model 252 directly within the CNC itself. This CNC OPCUA model 252 allows the CNC 216 to directly configure the controller switch 212 and the device switch 214, without the need for a YANG model or an MIB model. As such, the switches 212, 214 do not need to be implemented nor described with a YANG model or an MIB model, which in turn allows the industrial controller 202 and the industrial device 204 to be implemented without the OPCUA-to-NETCONF-YANG mapping component from FIG. 1. OPCUA connections sent from the CUC 234 to the CNC 216 are then translated and mapped by the CNC OPCUA model 252 for the network switches 210 via the YANG model or the MIB model 202 within the CNC 216. This results in a much easier and cost-effective way to implement OPCUA on TSN capable industrial systems like the industrial system 200.

It should be understood that when a model is described herein as being present in a device, switch, or other component, the protocol that supports that model is also available in the device, switch, or other component. Combining or mixing devices with different models and protocols will typically require implementation of one or more components that can perform translation between the different models and protocols, as discussed above with respect to FIG. 1. This is particularly the case when mixing devices with different protocols, as some model components will need to be carried over for backwards compatibility purposes. In the example of FIG. 1, for example, a translator is needed to perform translation from NETCONF-YANG to OPCUA that can link legacy devices to a fully functional OPCUA domain. Thus, in general, all control devices (e.g., CUC, CNC) Engineering Tools, controllers (e.g., PLC, DCS, Edge Controllers, etc.), controlled devices (e.g., I/O, drives, cameras, sensors, etc.), switches (e.g. bridges, routers, wireless access points, etc.), and all network participating components will need to understand and implement the OPCUA protocol and its models to their usable extent.

Figure 3:
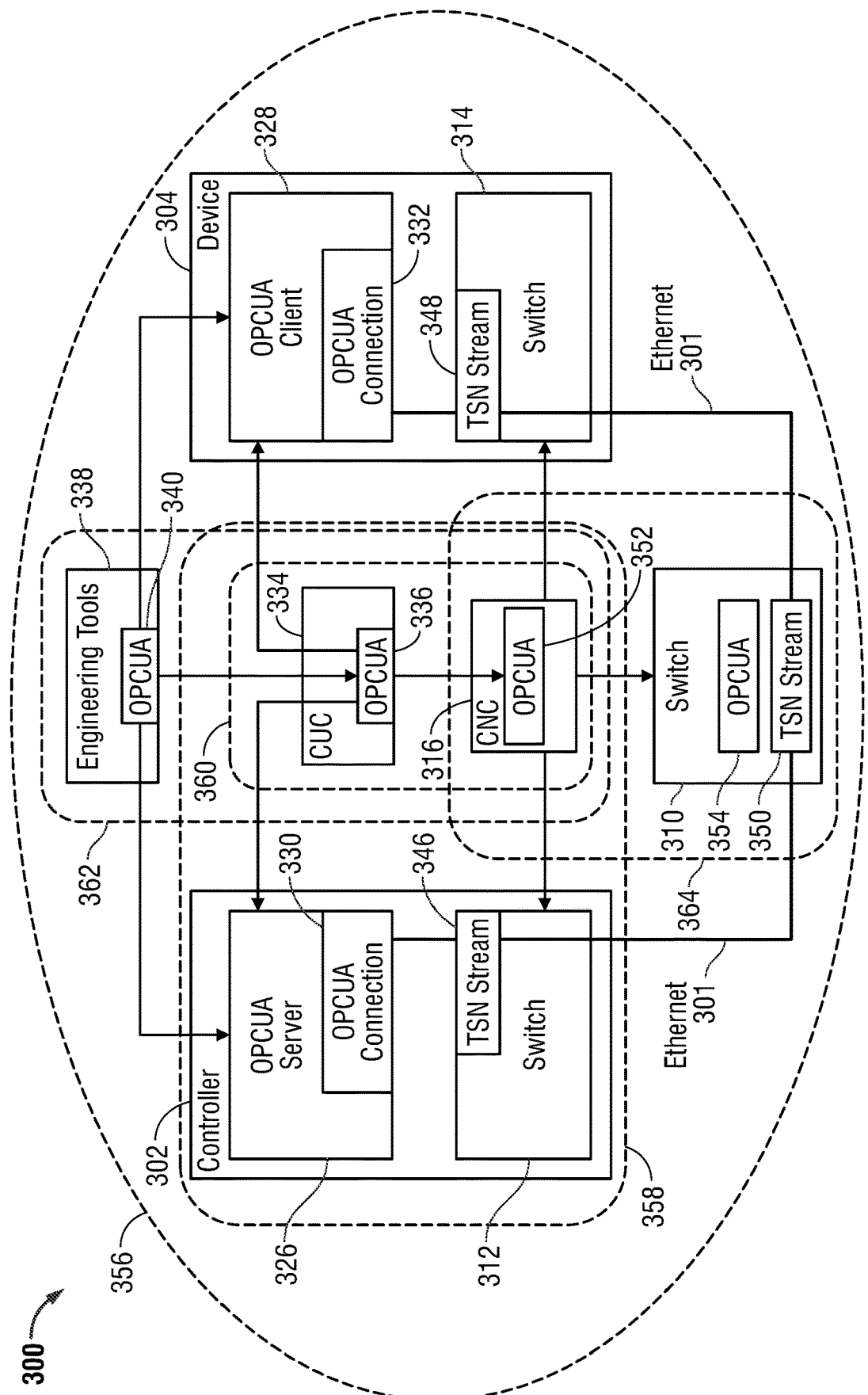
FIG. 3 is a functional block diagram illustrating a still alternative TSN capable OPCUA industrial system in accordance with some embodiments of this disclosure.

Turning now to FIG. 3, a functional block diagram can be seen for another exemplary TSN capable industrial system 300 implementing an improved CNC, indicated at 316. The industrial system 300 is again similar to the TSN industrial system from previous figures insofar as elements that are labeled with 300 series numbering are similar to their counterparts from previous figures. Accordingly, there is an industrial controller 302 that is used to automatically control operation of at least one industrial device 304 to perform an industrial function at the facility. A network 301, such as an Ethernet network, provides the signal pathway for messages to travel between the industrial controller 302 and the industrial device 304, as well as other devices on the network 301. The network 301 includes one or more network switches 310 for provisioning a TSN stream 350 between the industrial controller 302 and industrial device 304. The industrial controller 302 similarly includes a controller switch 312 for provisioning its respective TSN stream 346 and the industrial device 304 similarly includes a device switch 314 for provisioning its respective TSN stream 348, as shown.

A CNC 316 is once again used to configure the network switches 310, as represented by the arrow therebetween, to provide a way for messages to be routed through the network switches 310 based on the type of devices that send and receive the messages. The industrial controller 302 includes an OPCUA server 326 that is configured to publish/send or subscribe/receive OPCUA messages to the at least one industrial device 304, and each industrial device 304 includes an OPCUA client 328 that can subscribe/receive or publish/send OPCUA messages from the industrial controller 302. A controller OPCUA connection 330 within the OPCUA server 326 and a device OPCUA connection 332 within the OPCUA client 328 allows the OPCUA server 326 and the OPCUA client 328 to communicate with each other and with other devices on the network.

A CUC 334 is once again present to provide OPCUA connection configuration that carries the parameters required to provision a TSN stream within the network switches 310, the controller switch 312, and the device switch 314. The CUC 334 includes a CUC OPCUA model 336 that performs translation or mapping of requested OPCUA connections received from the CUC 334 to the CNC 316. Any network tools within a set of engineering tools 338 that may be needed to configure and set up the industrial controller 302, the industrial device 304, and/or the CUC 334, as represented by the arrows therebetween, are also equipped with an engineering tool OPCUA model 340.

However, the industrial system 300 is entirely OPCUA based, such that the device configuration domain and the network configuration domain form a single OPCUA configuration domain, rather than two separate domains, as was the case in FIGS. 1 and 2. In particular, the CNC 316 not only includes a CNC OPCUA model 352 directly therein, but can also be implemented without a YANG and/or MIB model. Each switch 310 likewise includes an OPCUA model 354 that allows the switch to be directly configured by the CNC 316 without a YANG or MIB model, thereby simplifying implementation of the CNC 316 and the switches 354 for OPCUA. In such an arrangement, aggregate networking devices can be created using OPCUA features, and therefore network segmentation are described with ease of use. Moreover, diagnostics tools can use the same information and OPCUA protocol to maintain and diagnose network problems.

In the example of FIG. 3, the industrial system 300 has been implemented as a distributed system in which the CNC and CUC functionality has been distributed across multiple components and devices. The CNC and CUC are preferably, but not necessarily, distributed using a model more suitable for distribution of the CNC and CUC, rather than distribution in accordance with IEC61499 (which is more focused on distribution of industrial applications). This is conceptually represented by the dashed outline at 356. Such a distributed arrangement provides multiple components and devices with runtime access to networking infrastructure and hence decision-making ability regarding workload deployment. In other embodiments, the industrial system 300 may be implemented as an integrated system in which the CNC and CUC functionality can be integrated into the industrial device and the CUC and CNC then directly control the device, as indicated by the dashed outline at 358. In still other embodiments, the industrial system 300 may be implemented as a fused system in which CNC and CUC functionality may be combined into a single device, as indicated by the dashed outline at 360. In yet other embodiments, it is possible to incorporate the CNC and CUC functionality into the engineering tools used to configure and set up the industrial system 300, as indicated by the dashed outline at 362.

In still other embodiments, it is possible for the CNC and CUC functionality discussed herein to reside in a cloud computing environment. For example, an instance of the CNC and CUC functionality can be virtualized via a cloud container. It is additionally possible for an instance of the CNC and CUC functionality to be downloaded from the cloud to run from within one of the network switches 310 in the network 301, as indicated by the dashed outline 364. Commonly available "high end" or comparable network switches 310 typically include a processor and storage device that are required, by design, to have more than sufficient processing capacity, data throughput, and storage space to implement the disclosed CNC and CUC functionality.

Figure 4:
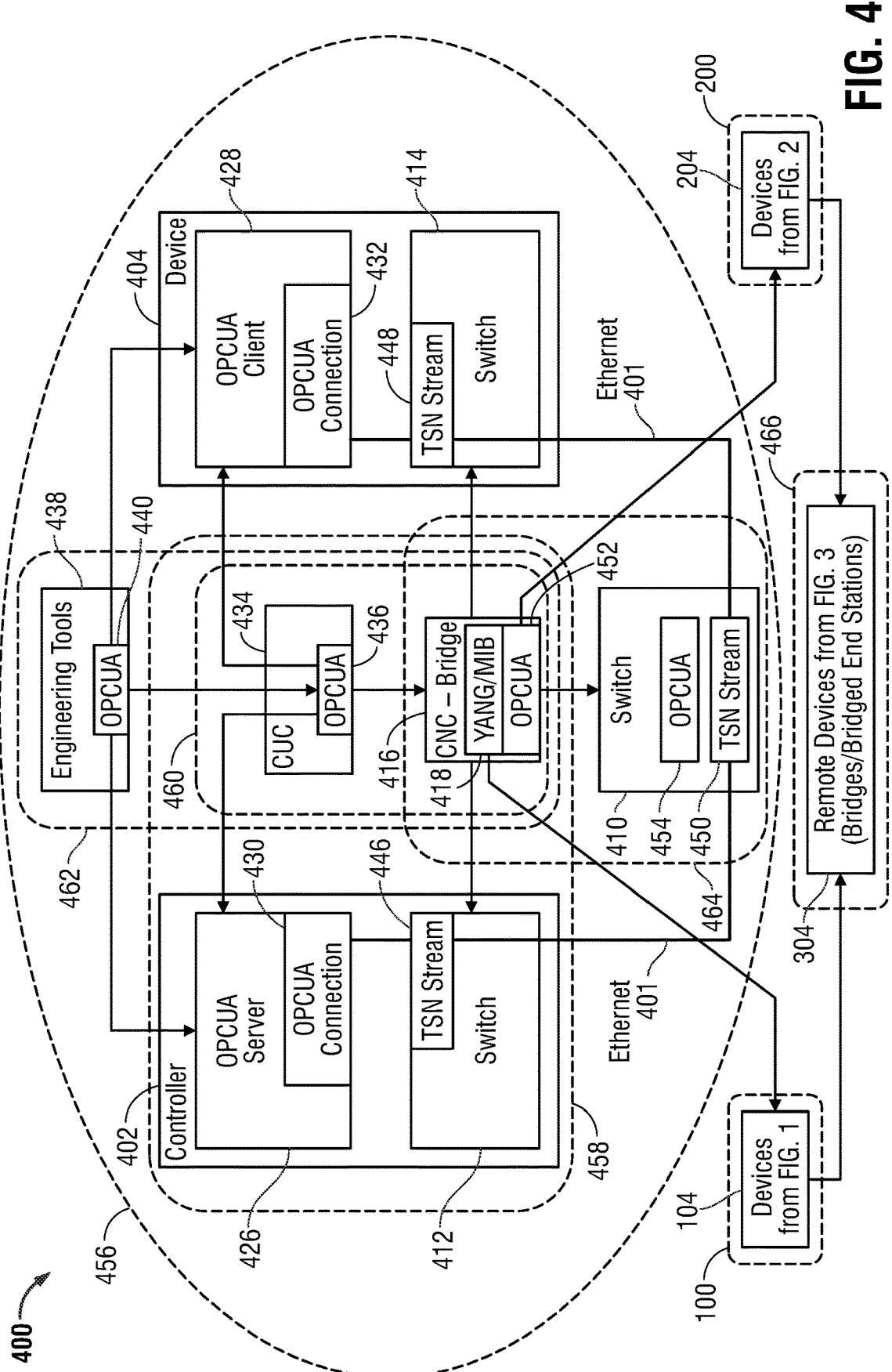
FIG. 4 is a functional block diagram illustrating a yet alternative TSN capable OPCUA industrial system in accordance with some embodiments of this disclosure.

FIG. 4 is a functional block diagram showing still another exemplary TSN capable industrial system 400 implementing an improved CNC, indicated at 416. The industrial system 400 is similar to the TSN industrial system 300 from FIG. 3 insofar as elements that are labeled with 400 series numbering are similar to their counterparts from FIG. 3. Accordingly, there is an industrial controller 402 that is used to automatically control operation of at least one industrial device 404 to perform an industrial function at the facility. A network 401, such as an Ethernet network, provides the signal pathway for messages to travel between the industrial controller 402 and the industrial device 404, as well as other devices on the network 401. The network 401 includes one or more network switches 410 for provisioning a TSN stream 450 between the industrial controller 402 and industrial device 404. The industrial controller 402 similarly includes a controller switch 412 for provisioning its respective TSN stream 446 and the industrial device 404 similarly includes a device switch 414 for provisioning its respective TSN stream 448, as shown.

A CNC 416 is once more used to configure the network switches 410, as represented by the arrow therebetween, to provide a way for messages to be routed through the network switches 410 based on the type of devices that send and receive the messages. The industrial controller 402 includes an OPCUA server 426 that is configured to publish/send or subscribe/receive OPCUA messages to the at least one industrial device 404, and each industrial device 404 includes an OPCUA client 428 that can subscribe/receive or publish/send OPCUA messages from the industrial controller 402. A controller OPCUA connection 430 within the OPCUA server 426 and a device OPCUA connection 432 within the OPCUA client 428 allows the OPCUA server 426 and the OPCUA client 428 to communicate with each other and with other devices on the network.

A CUC 434 is once more present to provide OPCUA connection configuration that carries the parameters required to provision a TSN stream within the network switches 410, the controller switch 412, and the device switch 414. The CUC 434 includes a CUC OPCUA model 436 that performs translation or mapping of requested OPCUA connections received from the CUC 434 to the CNC 416. Any network tools within a set of engineering tools 438 that may be needed to configure and set up the industrial controller 402, the industrial device 404, and/or the CUC 434, as represented by the arrows therebetween, are also equipped with an engineering tool OPCUA model 440.

The industrial system 400, like the one in FIG. 3, has been implemented as a distributed system in which the CNC and CUC functionality has been distributed across multiple components and devices. This is again conceptually represented by the dashed outline at 456. In other embodiments, the industrial system 400 may be implemented as an integrated system in which the CNC and CUC functionality can be integrated into the industrial device and the CUC and CNC that directly control the device, as indicated by the dashed outline at 458. In still other embodiments, the industrial system 400 may be implemented as a fused system in which CNC and CUC functionality may be combined into a single device, as indicated by the dashed outline at 460. In yet other embodiments, it is possible to incorporate the CNC and CUC functionality into the engineering tools used to configure and set up the industrial system 400, as indicated by the dashed outline at 462.

And like the example of FIG. 3, it is possible for the CNC and CUC functionality discussed herein to reside in a cloud computing environment. An instance of the CNC and CUC functionality can be virtualized via a cloud container, for example. It is also possible for an instance of the CNC and CUC functionality to be downloaded from the cloud to run from within one of the network switches 410 in the network 401, as indicated by the dashed outline 464. Commonly available "high end" or comparable network switches 410 typically include a processor and storage device that are required, by design, to have more than sufficient processing capacity, data throughput, and storage space to implement the disclosed CNC and CUC functionality.

In the example of FIG. 4, the improved CNC 416 again includes a CNC OPCUA model 452 that allows the CNC 416 to directly configure the switch 410. In addition, the CNC OPCUA model 452 allows the CNC 416 to directly configure OPCUA capable industrial devices like the industrial device 204 from FIG. 2. And for backwards compatibility purposes, the improved CNC 416 also includes a YANG/MIB model 418 similar to the YANG/MIB model 118 from FIG. 1. The YANG/MIB model 418 allows the CNC 416 to directly configure pre-existing industrial devices similar to the industrial devices 104 from FIG. 1 (via the pre-existing YANG/MIB model in the switches of those devices 104). The industrial devices 104 from FIG. 1 and the industrial devices 204 from FIG. 2 may then be bridged to remote devices like the at least one device 304 from FIG. 3, via one or more bridges and/or bridged end stations generally indicated at 466. These bridges and/or bridged end stations 466 implement the address space in the OPCUA model, which eliminates an explicit need for implementation of YANG and MIB, while leaving open the option for data exchange using NETCONF or SNMP.

Figure 5:
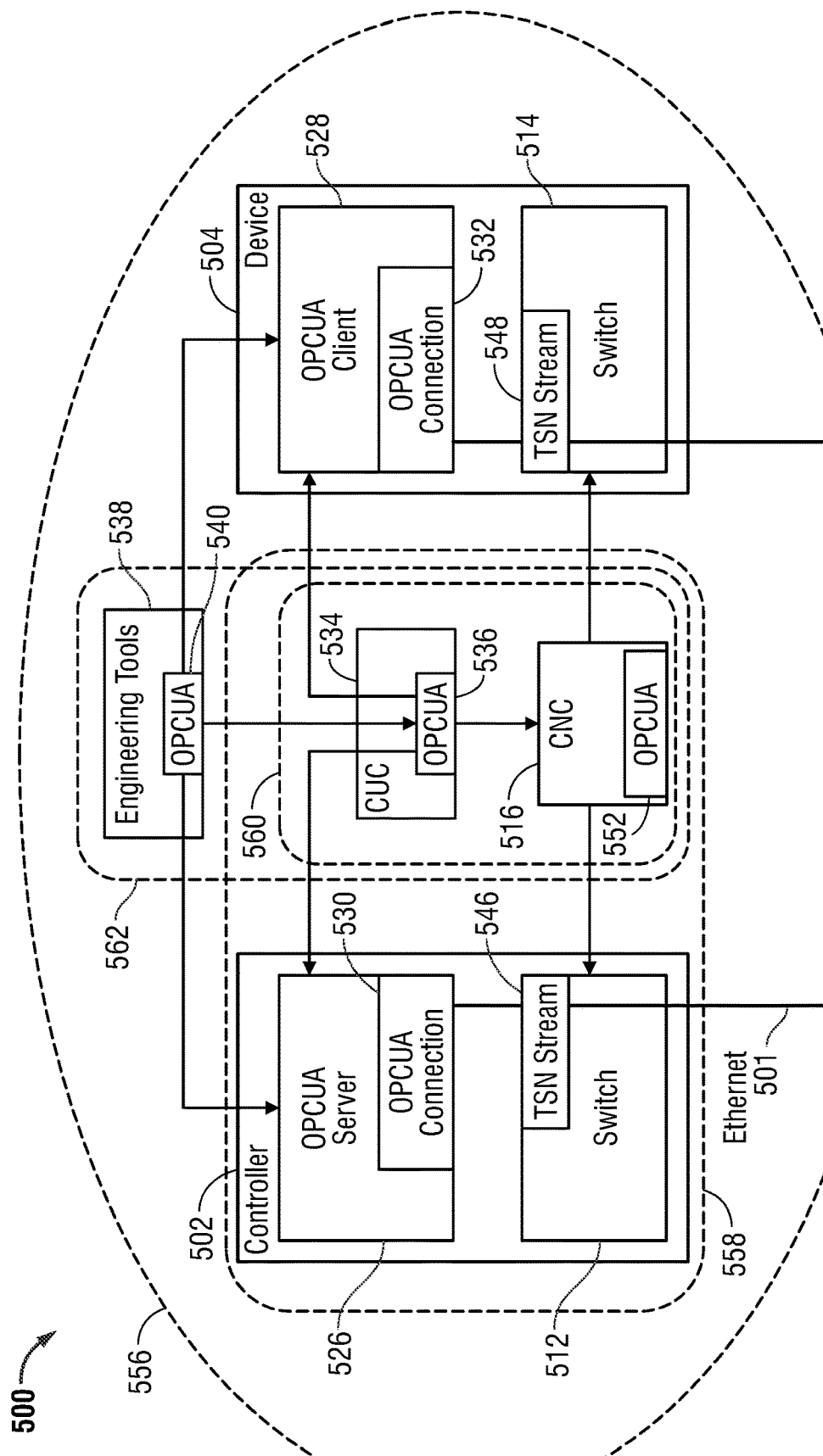
FIG. 5 is a functional block diagram illustrating a further alternative TSN capable OPCUA industrial system in accordance with some embodiments of this disclosure.

Referring next to FIG. 5, a functional block diagram is shown of yet another exemplary TSN capable industrial system 500 implementing an improved CNC 516. The industrial system 500 is similar to the TSN industrial systems from FIGS. 3 and 4 insofar as elements that are labeled with 500 series numbering are similar to their counterparts from FIGS. 3 and 4. Thus, there is an industrial controller 502 that is used to automatically control operation of at least one industrial device 504 to perform an industrial function at the facility. A network 501, such as an Ethernet network, provides the signal pathway for messages to travel between the industrial controller 502 and the industrial device 504, as well as other devices on the network 501. The network 501 includes one or more network switches 510 for provisioning a TSN stream 550 between the industrial controller 502 and industrial device 504. The industrial controller 502 similarly includes a controller switch 512 for provisioning its respective TSN stream 546 and the industrial device 504 similarly includes a device switch 514 for provisioning its respective TSN stream 548, as shown.

As before, the industrial controller 502 includes an OPCUA server 526 that is configured to publish/send or subscribe/receive OPCUA messages to the at least one industrial device 504, and each industrial device 504 includes an OPCUA client 528 that can subscribe/receive or publish/send OPCUA messages from the industrial controller 502. A controller OPCUA connection 530 within the OPCUA server 526 and a device OPCUA connection 532 within the OPCUA client 528 allows the OPCUA server 526 and the OPCUA client 528 to communicate with each other and with other devices on the network.

Also as before, a CUC 534 is present to provide OPCUA connection configuration that carries the parameters required to provision a TSN stream. The CUC 534 includes a CUC OPCUA model 536 that performs translation or mapping of requested OPCUA connections received from the CUC 534 to the CNC 516. Any network tools within a set of engineering tools 538 that may be needed to configure and set up the industrial controller 502, the industrial device 504, and/or the CUC 534, as represented by the arrows therebetween, are also equipped with an engineering tool OPCUA model 540.

The improved CNC 516 in FIG. 5 includes a CNC OPCUA model 552 that allows the CNC 516 to directly configure OPCUA capable devices. However, in this implementation, the CNC 516 has been integrated with an OPCUA capable CUC 534 as an independent switch, indicated by the dashed line 560. The independent switch 560 should of course have sufficient processing capacity to provide the capabilities of both a CNC and a CUC. In some embodiments, the independent switch 560 already supports NETCONF-YANG, and thus has backwards compatibility for pre-existing industrial devices and infrastructure. It is not necessary, however, for the independent switch 560 to already support NETCONF-YANG for purposes of one or more embodiments disclosed herein.

Figure 6:
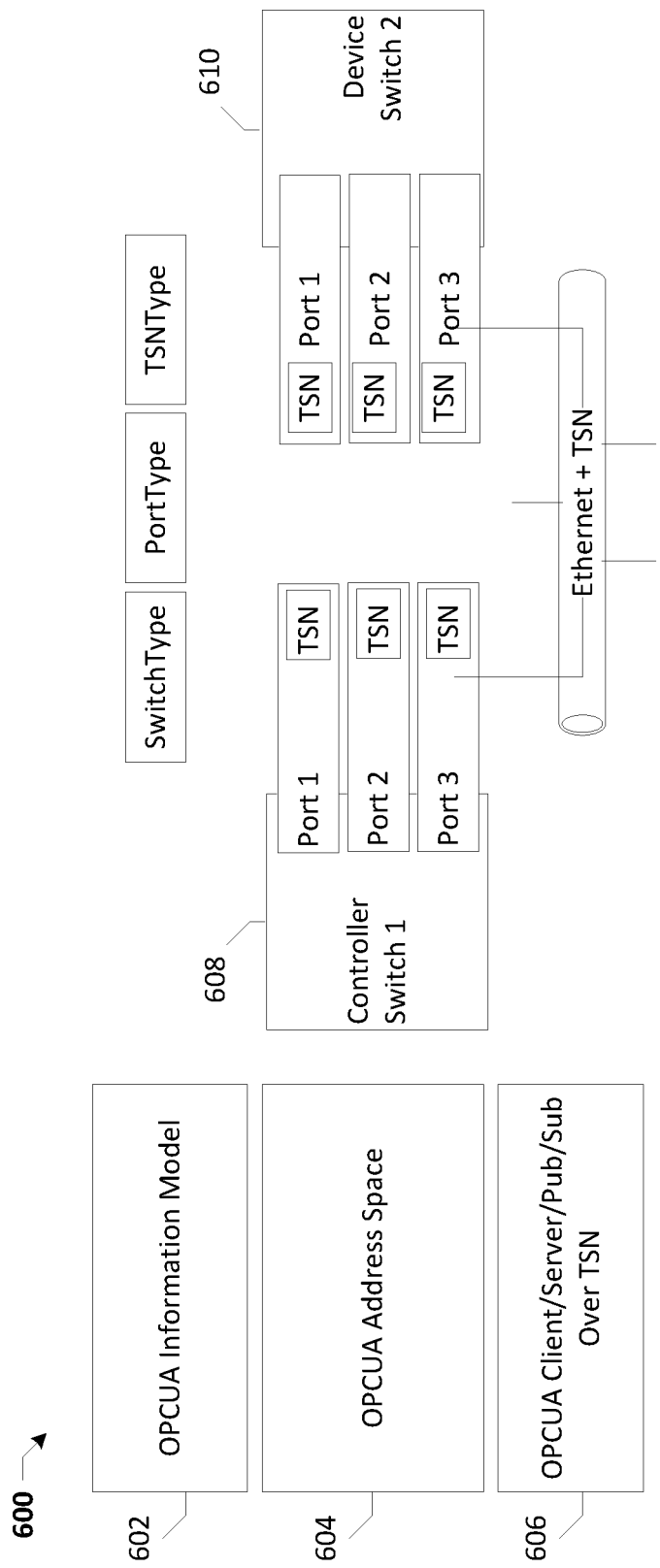
FIG. 6 is a functional block diagram illustrating an exemplary CNC OPCUA model in accordance with some embodiments of this disclosure.

FIG. 6 is a functional block diagram showing an exemplary CNC OPCUA model 600 that may be included in the CNC 216 of FIG. 2 or the CNC 316 of FIG. 3, for example. The CNC OPCUA model 600 is made up of several functional components, including an OPCUA information model 602, an OPCUA address space 604, and an OPCUA client/server/pub/sub over TSN component 606. The OPCUA information model 602 is basically a set of objects that can be used to create custom and complex data types built on top of the base OPCUA types. Some of the OPCUA types include switch type, port type, TSN type, and many others. For example, the OPCUA information model 602 may be used to define a first controller switch 608, controller switch 1, having three ports, port 1, port 2, and port 3. Each of these ports can be used to provision a TSN connection over a network, such as an Ethernet network. A device switch 610, such as device switch 2, may be defined similarly to the controller switch. The OPCUA address space 604 allows the objects in the OPCUA information model 602 to be identified and located using their addresses. As for the client/server/pub/sub over TSN component 606, this component provides client/server/pub/sub over TSN, as the name suggests.

The foregoing model also provides the ability to describe and manage the functionality of the switches, their features, and their operation. Once configured, their current communication paths (connections) can be described as well, thereby giving a detailed view of the entire network to the CNC and to personnel with direct access ability. With the proper diagnostic facilities, including counters and events, the quality of the network can be monitored and controlled by the CNC, by technical personnel, and by various industrial applications as well.

Figure 7:
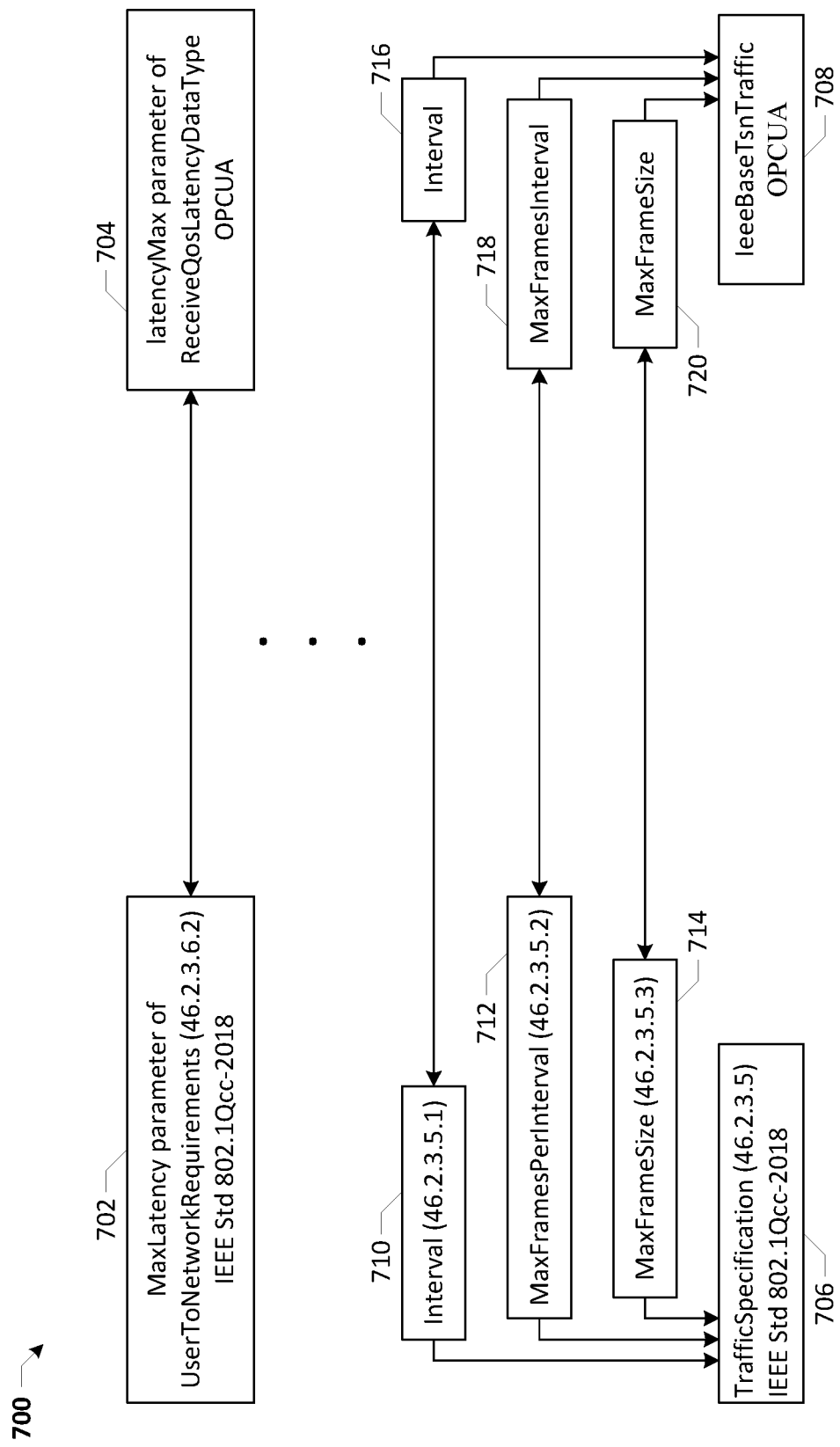
FIG. 7 is a TSN parameter map illustrating an exemplary mapping of IEEE parameters to OPCUA parameters in accordance with some embodiments of this disclosure.

FIG. 7 is an exemplary TSN parameter map 700 may be used to implement a YANG/MIB-to-OPCUA network information model translator that generates OPCUA address space from existing MIB and YANG models and makes it manageable using OPCUA features translation of IEEE networking parameters to OPCUA networking parameters in accordance with embodiments of this disclosure. The exemplary translator may be used with any of the components discussed herein that perform translation or mapping from the NETCONF-YANG and SNMP-MIB protocols to OPCUA, and vice versa. These components include any of industrial controllers and industrial devices (including the OPCUA-to-NETCONF-YANG mapping components therein), the CUCs, the CNCs, and the network switches. Only a limited number of parameters are mapped in this example for economy purposes, and it is expected that the mapping, at least in some embodiments, will be a manual process.

In the present example, the MaxLatency parameter 702 of the UserToNetworkRequirements group as set in IEEE Std 802.1Qcc-2018 (Clause 46.2.3.6.2) is mapped to the latencyMax parameter 704 of the ReceiveQosLatencyDataType group in OPCUA. Similarly, several parameters of the TrafficSpecification group 706 in IEEE (Clause 46.2.3.5) is mapped to their counterparts in the IeeeBaseTsnTraffic group 708 in OPCUA. Specifically, the Interval parameter 710 in IEEE (Clause 46.2.3.5.1) is mapped to the Interval parameter 716 in OPCUA, while the MaxFramesPerInterval parameter 712 in IEEE (Clause 46.2.3.5.2) is mapped to the MaxFramesInterval parameter 718 in OPCUA, and the MaxFrameSize parameter 714 in IEEE (Clause 46.2.3.5.3) is mapped to the MaxFrameSize parameter 720 in OPCUA. Those having ordinary skill in the art will understand that a more fulsome parameter map may be derived from the teachings disclosed herein.

Thus far, a number of specific embodiments have been shown and described. Following now in FIG. 8 is a general method that may be used to implement these various embodiments.

Figure 8:
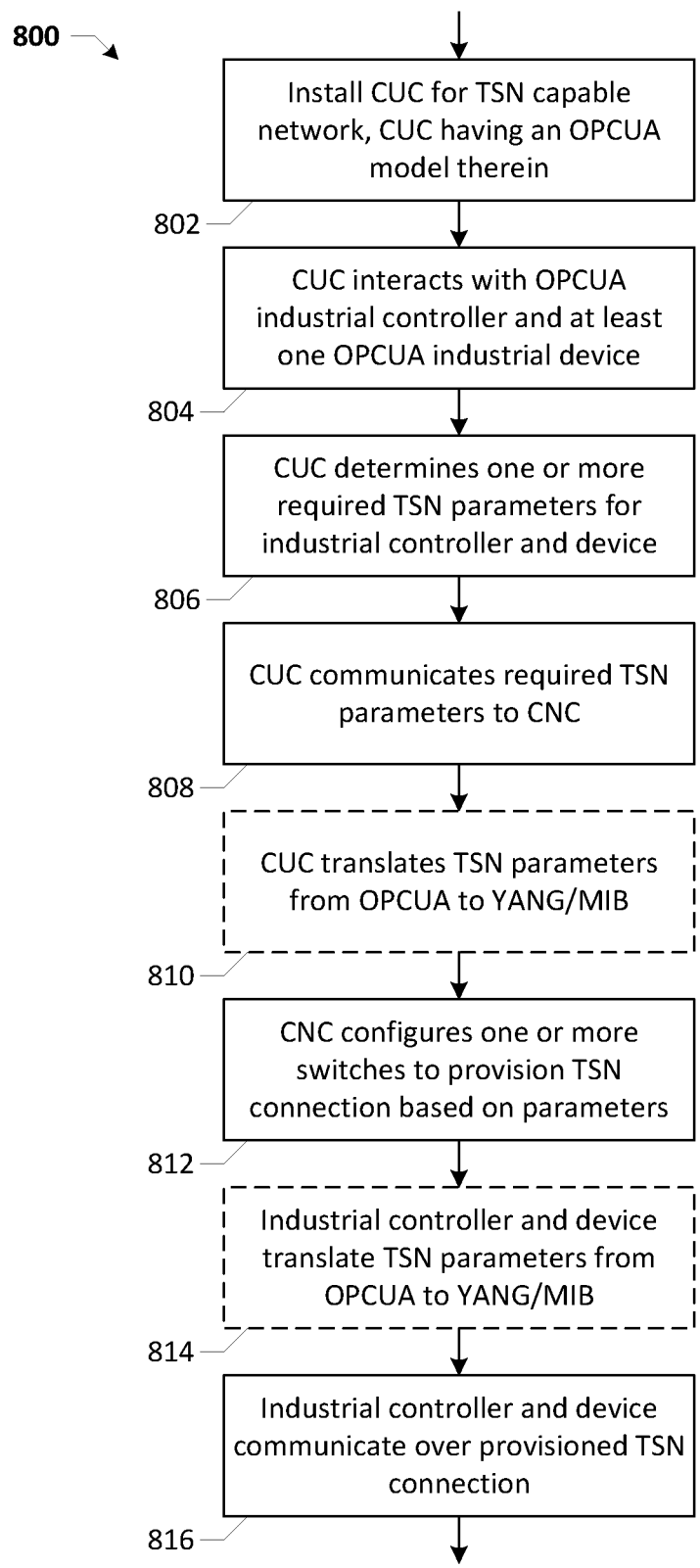
FIG. 8 is a flow diagram illustrating a method of implementing OPCUA in a TSN capable network in accordance with some embodiments of this disclosure.

Referring to FIG. 8, a flowchart 800 is shown for a method for implementing OPCUA in a TSN capable network according to various embodiments of the present disclosure. The method generally begins at 802 where a CUC having an OPCUA model therein is installed, implemented, or otherwise configured for the network. This configuring can be done using one or more, or a set of, network engineering tools that also have an OPCUA model therein. At 804, the CUC connects to and otherwise interacts with an industrial controller (e.g., motor controller) and at least one industrial device (e.g., automated cheese blade) being controlled by the controller over the network. The industrial controller and the device, also called TSN end stations, are also OPCUA based in that the controller has an OPCUA server therein and the at least one device has an OPCUA client therein.

At 806, the CUC determines one or more TSN parameters that are required by the industrial controller and the industrial device in order for the controller to be able to control the device in a time-critical manner over the network. These TSN parameters may include, for example, maximum latency allowed, maximum frame size allowed, maximum frame interval allowed, and the like. At 808, the CUC communicates the required TSN parameters to a CNC of the network to provision a TSN connection according to the required parameters. In some embodiments, the CNC may be an OPCUA based CNC that has an OPCUA model therein, in which case no translation of the TSN parameters as needed from the CUC to the CNC. On the other hand, if the CNC is a NETCONF/SNMP based CNC that has a YANG/MIB model therein, then as an optional step at 810, the CUC translates the TSN parameters from OPCUA to YANG/MIB using, for example, the exemplary mapping of IEEE parameters to OPCUA parameters described with respect in FIG. 7.

In either case, at 812, the CNC then communicates with and configures one or more switches (or bridges or relays) in the network to provision the TSN connection for the controller and the at least one device based on the required TSN parameters. Thereafter, at 816, the controller and the at least one device begin communicating with one another over the provisioned TSN connection. In some embodiments, depending on whether there is a YANG/MIB based switch in the controller and the at least one device, the controller and the at least one device may need to translate the TSN parameters from OPCUA to YANG/MIB, as optionally indicated at 814.

Figure 9:
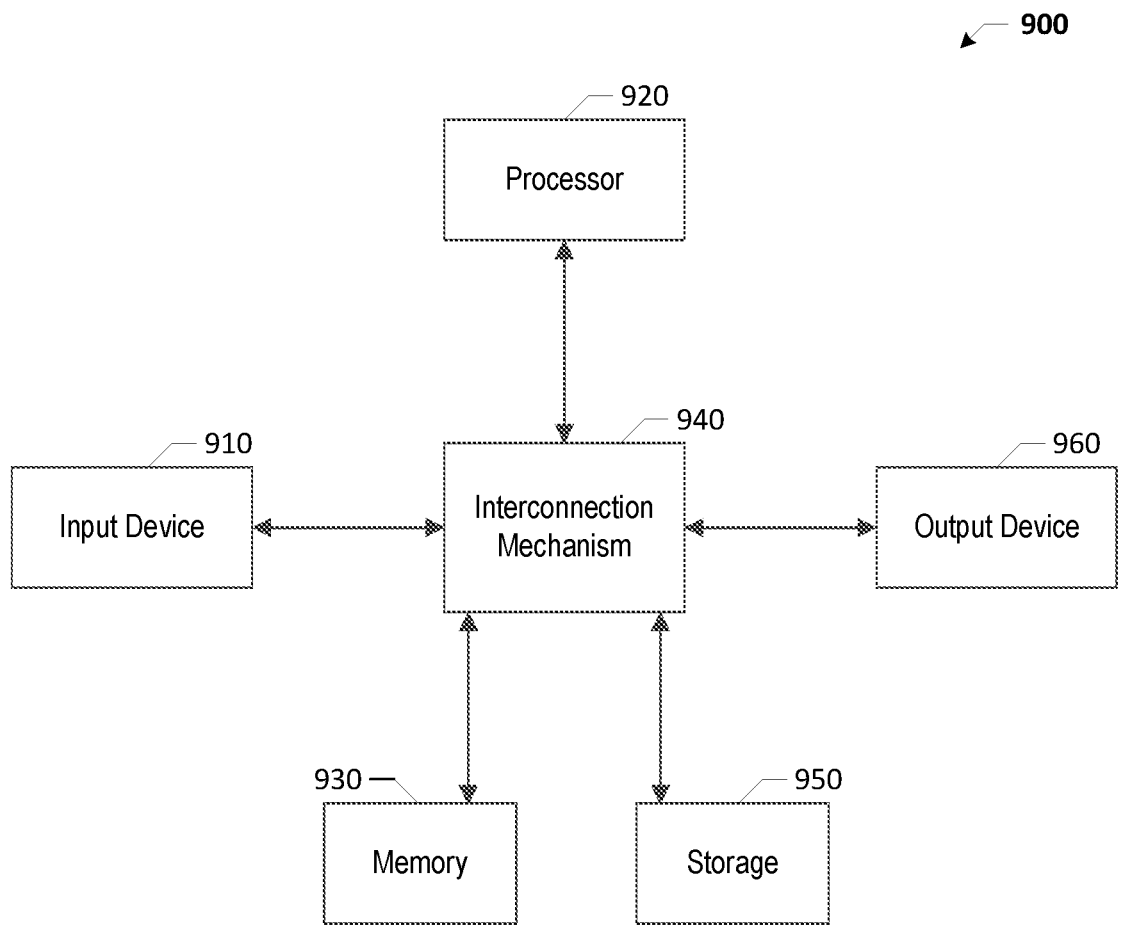
FIG. 9 is a functional block diagram of a general-purpose computer system that may be used to implement various embodiments of this disclosure.

FIG. 9 illustrates an exemplary computing system that may be used to implement various embodiments of this disclosure. In general, any general-purpose computer systems used in various embodiments of this disclosure may be, for example, general-purpose computers such as those based on processors available from Intel®, Motorola®, Hewlett-Packard®, Advanced Micro Devices, and other suitable types of processor. Such computer systems may be either physical or virtual.

For example, various embodiments of the disclosure may be implemented as specialized software executing in a general-purpose computer system 900 such as that shown in FIG. 9. The computer system 900 may include a processor 920 connected to one or more memory devices 930, such as a disk drive, memory, or other device for storing data. Memory 930 is typically used for storing programs and data during operation of the computer system 900. The computer system 900 may also include a storage system 950 that provides additional storage capacity. Components of computer system 900 may be coupled by an interconnection mechanism 940, which may include one or more busses (e.g., between components that are integrated within the same machine) and/or a network (e.g., between components that reside on separate discrete machines). The interconnection mechanism 940 enables communications (e.g., data, instructions) to be exchanged between system components of system 900.

Computer system 900 also includes one or more input devices 910, for example, a keyboard, mouse, trackball, microphone, touch screen, and one or more output devices 960, for example, a printing device, display screen, speaker. In addition, computer system 900 may contain one or more interfaces (not shown) that connect computer system 900 to a communication network (in addition or as an alternative to the interconnection mechanism 940).

Figure 10:
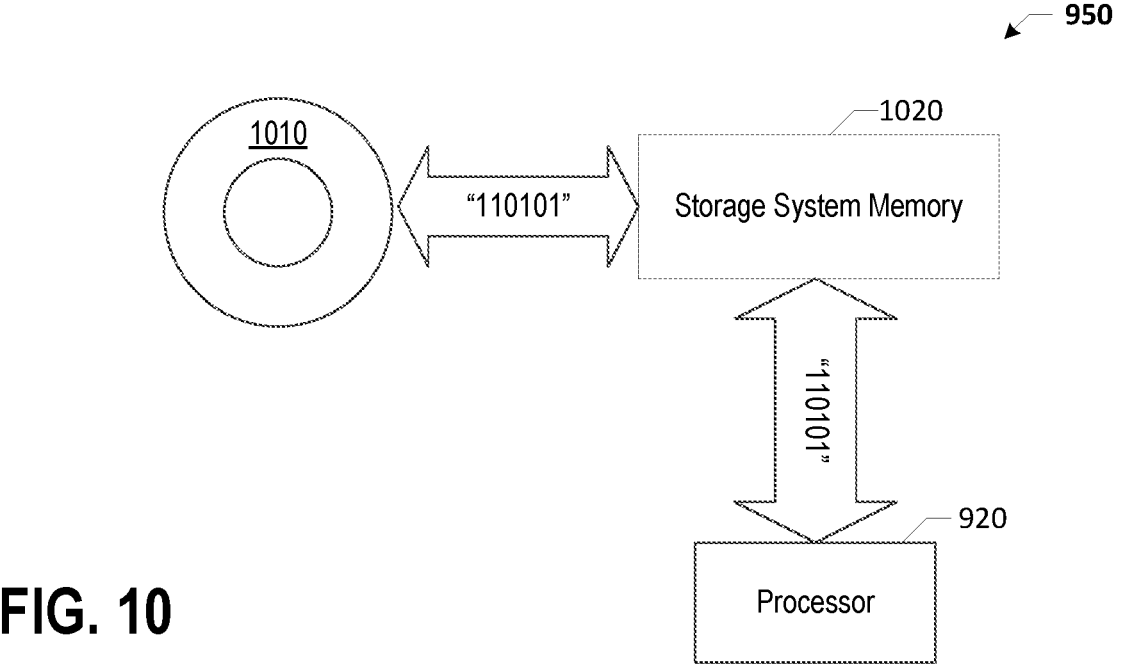
FIG. 10 is a functional block diagram of a general-purpose storage system that may be used to implement various embodiments of this disclosure.

The storage system 950, shown in greater detail in FIG. 10, typically includes a computer readable and writeable nonvolatile recording medium 1010 in which signals are stored that define a program to be executed by the processor 920 or information stored on or in the medium 1010 to be processed by the program to perform one or more functions associated with embodiments described herein. The medium may, for example, be a disk or flash memory. Typically, in operation, the processor 920 causes data to be read from the nonvolatile recording medium 1010 into storage system memory 1020 that allows for faster access to the information by the processor than does the medium 1010. This storage system memory 1020 is typically a volatile, random access memory such as a dynamic random-access memory (DRAM) or static memory (SRAM). This storage system memory 1020 may be located in storage system 950, as shown, or in the system memory 930. The processor 920 generally manipulates the data within the memory system 1020 and then copies the data to the medium 1010 after processing is completed. A variety of mechanisms are known for managing data movement between the medium 610 and the integrated circuit memory element 1020, and the disclosure is not limited thereto. The disclosure is not limited to a particular memory 1020, memory 930 or storage system 950.

The computer system may include specially programmed, special-purpose hardware, for example, an application-specific integrated circuit (ASIC). Aspects of the disclosure may be implemented in software, hardware or firmware, or any combination thereof. Further, such methods, acts, systems, system elements and components thereof may be implemented as part of the computer system described above or as an independent component.

Although computer system 900 is shown by way of example as one type of computer system upon which various aspects of the disclosure may be practiced, it should be appreciated that aspects of the disclosure are not limited to being implemented on the computer system as shown in FIG. 9. Various aspects of the disclosure may be practiced on one or more computers having a different architecture or components shown in FIG. 9. Further, where functions or processes of embodiments of the disclosure are described herein (or in the claims) as being performed on a processor or controller, such description is intended to include systems that use more than one processor or controller to perform the functions.

Computer system 900 may be a general-purpose computer system that is programmable using a high-level computer programming language. Computer system 900 may be also implemented using specially programmed, special purpose hardware. In computer system 900, processor 920 is typically a commercially available processor such as the well-known Pentium class processor available from the Intel Corporation. Many other processors are available. Such a processor usually executes an operating system which may be, for example, the Windows 95, Windows 98, Windows NT, Windows 2000, Windows ME, Windows XP, Vista, Windows 7, Windows 10, or progeny operating systems available from the Microsoft Corporation, MAC OS System X, or progeny operating system available from Apple Computer, UNIX, Linux (any distribution), or progeny operating systems available from various sources. Many other operating systems may be used.

The processor and operating system together define a computer platform for which application programs in high-level programming languages are written. It should be understood that embodiments of the disclosure are not limited to a particular computer system platform, processor, operating system, or network. Also, it should be apparent to those skilled in the art that the present disclosure is not limited to a specific programming language or computer system. Further, it should be appreciated that other appropriate programming languages and other appropriate computer systems could also be used.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

It will be appreciated that the development of an actual commercial application incorporating aspects of the disclosed embodiments will require many implementation specific decisions to achieve a commercial embodiment. Such implementation specific decisions may include, and likely are not limited to, compliance with system related, business related, government related and other constraints, which may vary by specific implementation, location and from time to time. While a developer's efforts might be considered complex and time consuming, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the invention.

This disclosure is not limited in its application to the details of construction and the arrangement of components set forth in the following descriptions or illustrated by the drawings. The disclosure is capable of other embodiments and of being practiced or of being carried out in various ways. Also, the phraseology and terminology used herein is for the purpose of descriptions and should not be regarded as limiting. The use of "including," "comprising," "having," "containing," "involving," and variations herein, are meant to be open-ended, i.e., "including but not limited to."

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

One or more portions of the computer system may be distributed across one or more computer systems coupled to a communications network. For example, as discussed above, a computer system that determines available power capacity may be located remotely from a system manager. These computer systems also may be general-purpose computer systems. For example, various aspects of the disclosure may be distributed among one or more computer systems configured to provide a service (e.g., servers) to one or more client computers, or to perform an overall task as part of a distributed system. For example, various aspects of the disclosure may be performed on a client-server or multi-tier system that includes components distributed among one or more server systems that perform various functions according to various embodiments of the disclosure. These components may be executable, intermediate (e.g., IL) or interpreted (e.g., Java) code which communicate over a communication network (e.g., the Internet) using a communication protocol (e.g., TCP/IP). For example, one or more database servers may be used to store device data, such as expected power draw, that is used in designing layouts associated with embodiments of the present disclosure.

It should be appreciated that the disclosure is not limited to executing on any particular system or group of systems. Also, it should be appreciated that the disclosure is not limited to any particular distributed architecture, network, or communication protocol.

Various embodiments of the present disclosure may be programmed using an object-oriented programming language, such as SmallTalk, Java, C++, Ada, or C# (C-Sharp). Other object-oriented programming languages may also be used. Alternatively, functional, scripting, and/or logical programming languages may be used, such as BASIC, Fortran, Cobol, TCL, or Lua. Various aspects of the disclosure may be implemented in a non-programmed environment (e.g., analytics platforms, or documents created in HTML, XML or other format that, when viewed in a window of a browser program render aspects of a graphical-user interface (GUI) or perform other functions). Various aspects of the disclosure may be implemented as programmed or non-programmed elements, or any combination thereof.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

I claim:

1. A Time-Sensitive Networking (TSN) Open Platform Communications Unified Architecture (OPCUA) industrial network, comprising:
   an OPCUA based industrial controller connected to the industrial network via a controller switch in the industrial controller;
   an OPCUA based industrial device connected to the industrial network via a device switch in the industrial device;
   a Centralized User Configuration (CUC) connected to the industrial network, the CUC having an OPCUA model therein, the CUC operable to interact with the OPCUA based industrial controller and the OPCUA based industrial device to determine one or more TSN parameters required for provisioning a TSN connection therebetween; and
   a Centralized Network Controller (CNC) connected to the industrial network, the CNC operable to interact with the controller switch in the OPCUA based industrial controller and the device switch in the OPCUA based industrial device;
   wherein the CUC is further operable to transmit the one or more TSN parameters from the CUC to the CNC on the industrial network to request provisioning of the TSN connection; and
   wherein the CNC is further operable to configure the one or more TSN parameters in the controller switch of the OPCUA based industrial controller and the device switch of the OPCUA based industrial device to provision the TSN connection.

2. The industrial network according to claim 1, wherein the CNC is a NETCONF/SNMP based CNC, and the CUC is further operable to translate the TSN parameters from OPCUA parameters to YANG/MIB parameters.

3. The industrial network according to claim 1, wherein the CNC is a NETCONF/SNMP based CNC that has an OPCUA model therein, the CNC operable to translate the TSN parameters from OPCUA parameters to YANG/MIB parameters.

4. The industrial network according to claim 1, wherein the OPCUA based industrial controller includes a controller translation component therein and/or the OPCUA based industrial device includes a device translation component therein, the controller translation component and/or the device translation component operable to translate the TSN parameters from OPCUA parameters to YANG/MIB parameters.

5. The industrial network according to claim 1, further comprising a network switch connected to the industrial network, the network switch having an OPCUA model therein.

6. The industrial network according to claim 1, further comprising one or more engineering tools operable to configure the CUC, the one or more engineering tools having an OPCUA model therein.

7. The industrial network according to claim 1, wherein the CUC and the CNC are implemented on the industrial network as:
   a distributed system in which the CNC and CUC are distributed across multiple components and devices on the industrial network;

a cloud-based system in which the CNC and CUC reside in a cloud-computing environment;

an integrated system in which the CNC and CUC are integrated into the OPCUA based industrial controller and/or the OPCUA based industrial device, and the CUC and CNC directly control the industrial controller and/or the industrial device;

a fused system in which the CNC and CUC are combined into a single device; or one or more engineering tools used to configure the industrial network.

8. A method of implementing a Time-Sensitive Networking (TSN) Open Platform Communications Unified Architecture (OPCUA) industrial network, comprising:

connecting an OPCUA based industrial controller to the industrial network via a controller switch in the industrial controller;

connecting an OPCUA based industrial device to the industrial network via a device switch in the industrial device;

connecting a Centralized User Configuration (CUC) to the industrial network, the CUC having an OPCUA model therein;

connecting a Centralized Network Controller (CNC) to the industrial network, the CNC operable to interact with the controller switch in the OPCUA based industrial controller and the device switch in the OPCUA based industrial device;

operating the CUC to interact with the OPCUA based industrial controller and the OPCUA based industrial device to determine one or more TSN parameters required for provisioning a TSN connection therebetween;

transmitting the one or more TSN parameters from the CUC to the CNC on the industrial network to request provisioning of the TSN connection; and operating the CNC to configure the one or more TSN parameters in the controller switch of the OPCUA based industrial controller and the device switch of the OPCUA based industrial device to provision the TSN connection.

9. The method according to claim 8, wherein the CNC is a NETCONF/SNMP based CNC, further comprising translating the TSN parameters by the CUC from OPCUA parameters to YANG/MIB parameters.

10. The method according to claim 8, wherein the CNC is a NETCONF/SNMP based CNC that has an OPCUA model therein, further comprising translating the TSN parameters by the CNC from OPCUA parameters to YANG/MIB parameters.

11. The method according to claim 8, further comprising translating the TSN parameters by the OPCUA based industrial controller and/or the OPCUA based industrial device from OPCUA parameters to YANG/MIB parameters.

12. The method according to claim 8, further comprising connecting a network switch to the industrial network, wherein the network switch has an OPCUA model therein.

13. The method according to claim 8, further comprising configuring the CUC using one or more engineering tools, the one or more engineering tools having an OPCUA model therein.

14. The method according to claim 8, wherein the CUC and the CNC are implemented on the industrial network as:

a distributed system in which the CNC and CUC are distributed across multiple components and devices on the industrial network;

a cloud-based system in which the CNC and CUC reside in a cloud-computing environment;

an integrated system in which the CNC and CUC are integrated into the OPCUA based industrial controller and/or the OPCUA based industrial device, and the CUC and CNC directly control the industrial controller and/or the industrial device;

a fused system in which the CNC and CUC are combined into a single device; or one or more engineering tools used to configure the industrial network.

15. A non-transitory computer-readable medium having computer-readable instructions stored thereon for implementing a Time-Sensitive Networking (TSN) Open Platform Communications Unified Architecture (OPCUA) industrial network, the computer-readable instructions, when executed by one or more processors, cause the one or more processors to perform a process that:

connects an OPCUA based industrial controller to the industrial network via a controller switch in the industrial controller;

connects an OPCUA based industrial device to the industrial network via a device switch in the industrial device; and connects a Centralized User Configuration (CUC) to the industrial network, the CUC having an OPCUA model therein;

connects a Centralized Network Controller (CNC) to the industrial network, the CNC operable to interact with the controller switch in the OPCUA based industrial controller and the device switch in the OPCUA based industrial device;

operates the CUC to interact with the OPCUA based industrial controller and the OPCUA based industrial device to determine one or more TSN parameters required for provisioning a TSN connection therebetween;

operates the CUC to transmit the one or more TSN parameters to a Centralized Network Controller (CNC) on the industrial network to request provisioning of the TSN connection; and operates the CNC to configure the one or more TSN parameters in the controller switch of the OPCUA based industrial controller and the device switch of the OPCUA based industrial device to provision the TSN connection.

16. The non-transitory computer-readable medium according to claim 15, wherein the CNC is a NETCONF/SNMP based CNC and the computer-readable instructions cause the CUC to translate the TSN parameters from OPCUA parameters to YANG/MIB parameters.

17. The non-transitory computer-readable medium according to claim 15, wherein the CNC is a NETCONF/SNMP based CNC that has an OPCUA model therein and the computer-readable instructions cause the CNC to translate the TSN parameters from OPCUA parameters to YANG/MIB parameters.

18. The non-transitory computer-readable medium according to claim 15, wherein the computer-readable instructions further cause the OPCUA based industrial controller and/or the OPCUA based industrial device to translate the TSN parameters from OPCUA parameters to YANG/MIB parameters.

19. The non-transitory computer-readable medium according to claim 15, wherein the computer-readable instructions further cause a network switch to connect to the industrial network, wherein the network switch has an OPCUA model therein.

20. The non-transitory computer-readable medium according to claim 15, wherein the computer-readable instructions further cause one or more engineering tools to configure the CUC, the one or more engineering tools having an OPCUA model therein.

* * * * *